(12) United States Patent
Thalmann et al.

(10) Patent No.: US 11,365,657 B2
(45) Date of Patent: Jun. 21, 2022

(54) CONNECTION ADAPTER FOR CONNECTING A TREATMENT APPARATUS TO A CONNECTION HEAD OF A TREATMENT DEVICE FOR IN PARTICULAR LIQUID FLUIDS, CONNECTION HEAD, AND TREATMENT DEVICE

(71) Applicant: MANN+HUMMEL GmbH, Ludwigsburg (DE)

(72) Inventors: Christian Thalmann, Speyer (DE); Sangamesh Otageri, Davangere (IN); Mohan Bangalore Panneerselvam, Marathalli (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 315 days.

(21) Appl. No.: 16/593,805

(22) Filed: Oct. 4, 2019

(65) Prior Publication Data
US 2020/0102921 A1    Apr. 2, 2020

Related U.S. Application Data

(63) Continuation of application No. PCT/EP2018/058873, filed on Apr. 6, 2018.

(30) Foreign Application Priority Data

Apr. 6, 2017    (DE) .................... 10 2017 003 368.4

(51) Int. Cl.
*B01D 35/30*    (2006.01)
*F01M 11/03*    (2006.01)
(Continued)

(52) U.S. Cl.
CPC ............ *F01M 11/03* (2013.01); *B01D 35/306* (2013.01); *F02M 37/32* (2019.01); *B01D 27/08* (2013.01);
(Continued)

(58) Field of Classification Search
CPC .... B01D 35/306; B01D 27/08; B01D 35/005; B01D 35/30; B01D 2201/347;
(Continued)

(56) References Cited

U.S. PATENT DOCUMENTS 3,334,754 A * 8/1967 Kudlaty ................ B01D 27/00
  210/444
4,492,632 A    1/1985 Mattson
(Continued)

FOREIGN PATENT DOCUMENTS

BR    102014020222 A2    6/2015
CA    2797323 A1    5/2014
(Continued)

*Primary Examiner* — Thomas M Lithgow

(57) ABSTRACT

A connection adapter for connecting a treatment apparatus to a connection head of a treatment device for a fluid is provided with a connecting section that connects to the connection head. A threaded socket section coaxial to an imaginary connecting axis is provided to screw on the treatment apparatus. The threaded socket section has at least one fluid passage channel connecting a fluid-conducting space of the treatment apparatus to a fluid-conducting space of the connection head. The connecting section has at least two screw holes for receiving screws or threaded bolts or the connecting section has a central thread that connects to a connection head-associated central thread. An assembly of connection head and connection adapter is provided. A treatment device provided with connection head and connection adapter is provided.

16 Claims, 13 Drawing Sheets

(51) Int. Cl.
*F02M 37/32* (2019.01)
*B01D 27/08* (2006.01)
*B01D 35/00* (2006.01)

(52) U.S. Cl.
CPC ............ *B01D 35/005* (2013.01); *B01D 35/30* (2013.01); *B01D 2201/347* (2013.01); *B01D 2201/4015* (2013.01); *F01M 2011/031* (2013.01)

(58) Field of Classification Search
CPC .......... B01D 2201/4015; F01M 11/03; F01M 2011/031; F02M 37/32
USPC ....................................................... 210/232
See application file for complete search history.

(56) References Cited

U.S. PATENT DOCUMENTS

| | | |
|---|---|---|
| 5,743,358 A | 4/1998 | Bedi et al. |
| 5,762,671 A | 6/1998 | Farrow et al. |
| 6,355,169 B1 * | 3/2002 | Smith .................. B01D 35/306 210/249 |
| 7,329,337 B2 * | 2/2008 | Millar ................... B01D 35/30 210/85 |
| 2001/0037971 A1 * | 11/2001 | Bergeron ............. B01D 35/306 210/443 |
| 2007/0267339 A1 | 11/2007 | Munn |
| 2014/0110321 A1 * | 4/2014 | Bertin ................. B01D 27/103 210/167.08 |
| 2015/0298033 A1 | 10/2015 | Jones |
| 2015/0343347 A1 * | 12/2015 | Hindstrom ........... B01D 35/306 210/232 |

FOREIGN PATENT DOCUMENTS

| | | |
|---|---|---|
| EP | 0658362 A2 | 6/1995 |
| EP | 1669121 B1 | 6/2006 |
| EP | 2522412 A1 | 11/2012 |
| JP | 2003184528 A | 7/2003 |
| WO | 2015033110 A1 | 3/2015 |

* cited by examiner

CONNECTION ADAPTER FOR CONNECTING A TREATMENT APPARATUS TO A CONNECTION HEAD OF A TREATMENT DEVICE FOR IN PARTICULAR LIQUID FLUIDS, CONNECTION HEAD, AND TREATMENT DEVICE

CROSS-REFERENCE TO RELATED APPLICATIONS

This application is a continuation application of international application No. PCT/EP2018/058873 having an international filing date of 6 Apr. 2018 and designating the United States, the international application claiming a priority date of 6 Apr. 2017 based on prior filed German patent application No. 10 2017 003 368.4, the entire contents of the aforesaid international application and the aforesaid German patent application being incorporated herein by reference.

BACKGROUND OF THE INVENTION

The invention concerns a connection adapter for connecting a treatment apparatus to a connection head of a treatment device for in particular liquid fluids, in particular of an internal combustion engine, in particular of a motor vehicle, wherein the connection adapter comprises a connecting section for connecting to the connection head and a threaded socket section coaxial to an imaginary connecting axis for screwing on the treatment device, wherein the threaded socket section comprises at least one fluid passage channel for connecting a fluid-conducting space of the treatment apparatus to a liquid-conducting space of the connection head.

Moreover, the invention concerns a connection head of a treatment device for in particular liquid fluids, in particular of an internal combustion engine, in particular of a motor vehicle, with at least one connection adapter for connecting a treatment apparatus to the connection head, wherein the at least one connection adapter comprises a connecting section for connecting to the connection head and a threaded socket section coaxial to an imaginary connecting axis for screwing on the treatment apparatus, wherein the threaded socket section comprises at least one fluid passage channel for connecting a fluid-conducting space of the treatment apparatus to a fluid-conducting space of the connection head.

In addition, the invention concerns a treatment device for in particular liquid fluids, in particular of an internal combustion engine, in particular of a motor vehicle, with at least one connection head, with at least one treatment apparatus, and with at least one connection adapter for connecting the at least one treatment apparatus to the at least one connection head, wherein the connection adapter comprises a connecting section for connecting to the connection head and a threaded socket section coaxial to an imaginary connecting axis for screwing on the at least one treatment apparatus, wherein the threaded socket section comprises at least one fluid passage channel for connecting a fluid-conducting space of the at least one treatment apparatus to a fluid-conducting space of the connection head.

U.S. Pat. No. 5,762,671 A discloses an adapter that enables a person to employ different selected sizes of inexpensively available oil or air filters as air filters in order to achieve a greater air filtration for hydraulic systems. The adapter comprises a housing with an axial central opening, an enlarged cylindrical central section comprising a first and a second oppositely positioned surfaces, a first end section that extends away from the first surface of the central section and that comprises an enlarged external threaded section, a reduced cylindrical section that is fastened to the second surface of the enlarged cylindrical section of the housing, and a male bayonet connecting part that is fixed to the free end of the reduced cylindrical section of the housing for connecting to a female connecting part that is connected to a liquid container. The enlarged external threaded section and the smaller external threaded section are adapted to be connected selectively to differently sized inner thread openings in conventional standard oil filters.

The invention has the object to configure a connection adapter, a connection head, and a treatment device of the aforementioned kind in which the treatment apparatuses with connecting openings with inner threads can be connected to connection heads which comprise innately no threaded sockets for connecting to the connecting openings.

SUMMARY OF THE INVENTION

This object is solved according to the invention in that the at least one connecting section comprises at least two screw holes for screws or threaded bolts.

According to the invention, the connection adapter comprises, on the one hand, the threaded socket section to which the treatment apparatus can be mechanically and fluid-conductingly connected and, on the other hand, the connecting section with the screw holes with which the connection adapter by a corresponding screw connection can be connected to the connection head. In this way, treatment apparatuses with conventional connecting openings with inner threads can be screwed by means of the connection adapter to the connection head, wherein the connection head comprises only a connecting possibility by means of conventional screws or screw bolts. Accordingly, different types of connecting devices, in particular bayonet closure-type connecting devices, for connecting to corresponding treatment apparatuses, wherein the connecting devices by means of conventional screws or screw bolts are connected to a base member of the connection head, can be exchanged for the connection adapter according to the invention in order to be able to employ treatment apparatuses with conventional screw connections.

Alternatively, according to the invention the connection adapter comprises, on the one hand, the threaded socket section with which the treatment apparatus can be mechanically and fluid-conductingly connected and, on the other hand, the connecting section with the screw holes with which the connection adapter, by means of a corresponding screw connection, can be connected to the connection head. In this way, treatment apparatuses with conventional connecting openings with inner threads can be screwed by means of the connection adapter to the connection head, wherein the connection head comprises only a connecting possibility by means of a central thread. In this way, different types of connecting devices, in particular bayonet closure-type connecting devices, for connecting to corresponding treatment apparatuses, wherein the connecting devices by means of conventional screws or screw bolts are connected to a base member of the connection head, can be exchanged for the connection adapter according to the invention in order to be able to employ treatment apparatuses with conventional screw connections. In case that at the connection head no threaded bores for bolts are present but a central thread, the connection adapter can thus be mounted with a corresponding thread at the central thread of the connection head. The at least one connecting section requires therefore no screw holes for screws or threaded bolts but comprises a central thread which is coaxial to the central axis of the connection adapter and coaxial to the seals or sealing surfaces arranged at the connection adapter.

The treatment apparatus can be connected so as to be separable by means of the threaded socket section to the connection adapter and thus to the connection head. Accordingly, the treatment apparatus can be removed and/or exchanged in a simple way, in particular for servicing purposes.

The threaded socket section comprises at least one fluid passage channel for connecting a fluid-conducting space of the treatment apparatus to a fluid-conducting space of the connection head. With at least one fluid passage channel of the threaded socket section, a fluid outlet for purified fluid associated with the treatment apparatus can be connected to an outlet conduit for the purified fluid associated with the connection head. Alternatively or additionally, with at least one fluid passage channel of the threaded socket section an inlet conduit for the fluid to be purified associated with the connection head can be connected with a fluid inlet associated with the treatment apparatus.

Advantageously, the treatment device can be a filter device for filtering fluid. Particles can be removed from the fluid with the filter device.

Advantageously, the treatment apparatus can comprise or consist of a filter for fluid, in particular an exchangeable filter. By selecting a suitable connection adapter, different treatment apparatuses can thus be selectively connected to the same connection head. An exchangeable filter, which is also referred to as spin-on filter, can be exchanged completely with its housing and a filter element contained therein.

Advantageously, the treatment device can be a treatment device for liquid fluid, in particular fuel, oil, water, hydraulic liquid, aqueous urea solution or the like. Such liquids can be employed as operating media in internal combustion engines and/or motor vehicles.

The treatment apparatus can advantageously be a motor oil filter of an internal combustion engine of a motor vehicle. The motor oil filter can advantageously be part of an motor oil circuit of an internal combustion engine. It can serve for purifying motor oil which is supplied to the internal combustion engine. Alternatively, the treatment apparatus can be a fuel filter of an internal combustion engine of a motor vehicle. The fuel filter can be part of a fuel circuit of an internal combustion engine. It can serve for purifying fuel, in particular gasoline or diesel fuel, which is supplied to the internal combustion engine for combustion.

The invention is however not limited to a motor oil filter or a fuel filter of an internal combustion engine of a motor vehicle. Instead, it can also be used in different types of liquid systems, in particular hydraulic systems, cooling systems, fluid systems with aqueous urea solution or the like, of motor vehicles or other machines, in particular agricultural machines or construction machines. The treatment apparatus can be used also outside of the automotive field, in particular in industrial motors.

The invention can be used in motor vehicles, in particular passenger cars, trucks, buses, agricultural and/or construction vehicles, construction/agricultural machines, compressors, industrial motors or other devices, in particular with internal combustion engines.

In an advantageous embodiment, the screw holes, relative to the connecting axis, can be arranged radially outside of the threaded socket section or of an axial projection of the threaded socket section. In this way, screws or screw bolts arranged in the screw holes can be made to be better accessible from the exterior. Thus, mounting or demounting of the connection adapter can be simplified.

In a further advantageous embodiment, the connection adapter can comprise at least one part of at least one radially outwardly positioned fluid conduit which is located radially outside of the threaded socket section or of an axial projection of the threaded socket section and serves for connecting a further fluid-conducting space of the treatment apparatus to a further fluid-conducting space of the connection head. With at least one radially outwardly positioned fluid conduit, a fluid outlet for purified fluid associated with the treatment apparatus can be connected to an outlet conduit for the purified fluid associated with the connection head. Alternatively or additionally, with at least one radially outwardly positioned fluid conduit, an inlet conduit for fluid to be purified associated with the connection head can be connected to a fluid inlet associated with the treatment apparatus.

Advantageously, an inlet conduit for fluid to be purified can be at least partially formed with at least one radially outwardly positioned fluid conduit and an outlet conduit for purified fluid formed with the fluid passage channel of the threaded socket section, or vice versa.

In a further advantageous embodiment, the connecting section can comprise at least one cylinder section coaxial to the connecting axis for receiving a connecting socket of the connection head that is coaxial to the connecting axis. In this way, the connecting socket of the connection head can at least partially be conducted through the connection adapter to the treatment apparatus.

Advantageously, the connecting section can comprise two cylinder sections that are coaxial to the connecting axis. In this way, different regions, in particular fluid spaces, can be delimited with the cylinder sections and the connecting socket.

The cylinder sections can be arranged one behind the other, viewed axially relative to the connecting axis. An element-associated cylinder section axially facing the treatment apparatus can have a smaller diameter than a head-associated cylinder section facing away from the treatment apparatus. In this way, a fluid-conducting annular space can be realized in a region that is radial relative to the connecting axis between the radial outer circumferential side of the connecting socket and the radial inner circumferential side of the head-associated cylinder section. The radial inner circumferential side of the element-associated cylinder section can contact in particular tightly the radial outer circumferential side of the connecting socket.

Depending on the flow direction of the fluid through the treatment device, the interior of the connecting socket can serve as a fluid discharge for purified fluid and the annular space surrounding the connecting socket as a fluid inlet for purified fluid, or vice versa.

In the region of the head-associated cylinder section, flow openings for fluid can be realized advantageously. The flow openings can connect the annular space with an outer annular space of the connection adapter surrounding the cylinder sections. The outer annular space of the connection adapter in the mounted state can be in communication with the at least one fluid passage of the treatment apparatus.

In a further advantageous embodiment, the connection adapter can comprise a circumferential wall which surrounds circumferentially relative to the connecting axis at least one fluid-conducting annular space of the connection adapter. In this way, the at least one annular space can be delimited by the circumferential wall relative to the environment.

In a further advantageous embodiment, the connection adapter can comprise a sealing collar, which is facing the exchangeable filter to be connected, for contacting an exterior annular seal of the exchangeable filter to be connected, wherein the sealing collar is preferably arranged at a free rim of the circumferential wall. The sealing collar is arranged, further preferred, radially outside of the connecting section, in particular radially outside of the at least two screw holes or of the central thread. In this way, the entire interface can be designed in a space-saving way such that the radial extension does not project past the circumference of the outer annular seal of the exchangeable filter to be connected.

In a further advantageous embodiment, at least one screw hole can be arranged relative to the connecting axis radially within the circumferential wall or within an axial projection of the circumferential wall and/or at least one screw hole can be arranged relative to the connecting axis radially outside of the circumferential wall or of an axial projection of the circumferential wall.

Advantageously, at least one screw hole can be arranged relative to the connecting axis radially within the circumferential wall or of an axial projection of the circumferential wall. In this way, an annular space delimited by the circumferential wall can be designed to be correspondingly large.

Alternatively or additionally, at least one screw hole can be arranged relative to the connecting axis radially outside of the circumferential wall or of an axial projection of the circumferential wall. In this way, the corresponding screw or the threaded bolt can be arranged to be better accessible from the exterior. Also, the screw holes thus must not be sealed.

In a further advantageous embodiment, the connection adapter can comprise at least one part of an element sealing device for sealing a connection to the treatment apparatus and/or at least one part of a head sealing device for sealing a connection to the connection head.

Advantageously, the connection adapter can comprise at least one part of an element sealing device for sealing a connection to the treatment apparatus. In this way, at least a fluid-conducting space between the connection adapter and the treatment apparatus can be sealed in particular relative to the environment.

Alternatively or additionally, the connection adapter can advantageously comprise at least one part of a head sealing device for sealing a connection to the connection head. In this way, at least one fluid-conducting space between the connection adapter and the connection head can be sealed relative to another fluid-conducting space and/or relative to the environment.

Advantageously, a free rim of a circumferential wall can comprise a corresponding sealing surface, in particular an annular surface coaxial relative to the connecting axis, for contacting a seal, in particular an annular seal coaxial to the connecting axis, associated with the treatment apparatus. In this way, the connection between the connection adapter and the treatment apparatus can be sealed automatically by means of the corresponding seal when screwing on the treatment apparatus.

Advantageously, the connection adapter can comprise at least one seal, in particular an annular seal coaxial relative to the connecting axis, for sealing a fluid-conducting space relative to the environment. Alternatively or additionally, the connection adapter can comprise at least one seal, in particular an annular seal coaxial to the connecting axis, for sealing a fluid-conducting space between the connection adapter and the connection head relative to another fluid-conducting space between the connection adapter and the treatment apparatus.

In a further advantageous embodiment, at least one part of a screw hole sealing device can be arranged at least at one screw hole. In this way, the screw hole and a corresponding screw or a bolt can be sealed relative to a fluid-conducting space and/or the environment.

Advantageously, the at least one screw hole can be surrounded by a sealing surface for an in particular annular seal, in particular an O-ring seal. The seal can be compressed seal-tightly between a screw head or a nut, on the one hand, and the sealing surface, on the other hand.

In a further advantageous embodiment, the connection adapter can be designed unitarily with the connecting section and the threaded socket section. In this way, it can be manufactured, mounted, and demounted as one piece.

Moreover, the technical object is solved according to the invention by the connection head in that the at least one connecting section comprises at least two screw holes for screws or threaded bolts.

Also, the technical object in regard to the treatment device is solved in that the at least one connecting section comprises at least two screw holes for screws or threaded bolts.

Furthermore, the features and advantages disclosed in connection with the connection adapter according to the invention, the connection head according to the invention, and the treatment device according to the invention and their respective advantageous embodiments apply among each correspondingly, and vice versa. The individual features and advantages can be combined of course among each other, wherein further advantageous effects may be provided which surpass the sum of the individual effects.

BRIEF DESCRIPTION OF THE DRAWINGS

Further advantages, features, and details of the invention result from the following description in which embodiments of the invention are explained in more detail with the aid of the drawing. A person of skill in the art will consider the features disclosed in combination in the drawing, the description, and the claims expediently also individually and combine them to other expedient combinations.

In the Figures, same components are provided with same reference characters.

DESCRIPTION OF PREFERRED EMBODIMENTS

In FIGS. 1 to 9, a filter device 10 is shown in different perspective views, section views, and detail views. The filter device 10 can be, for example, an oil filter device for cleaning motor oil of an internal combustion engine of a motor vehicle. The filter device 10 can be arranged in an exemplary fashion in a motor oil circuit of the internal combustion engine.

Figure 1:
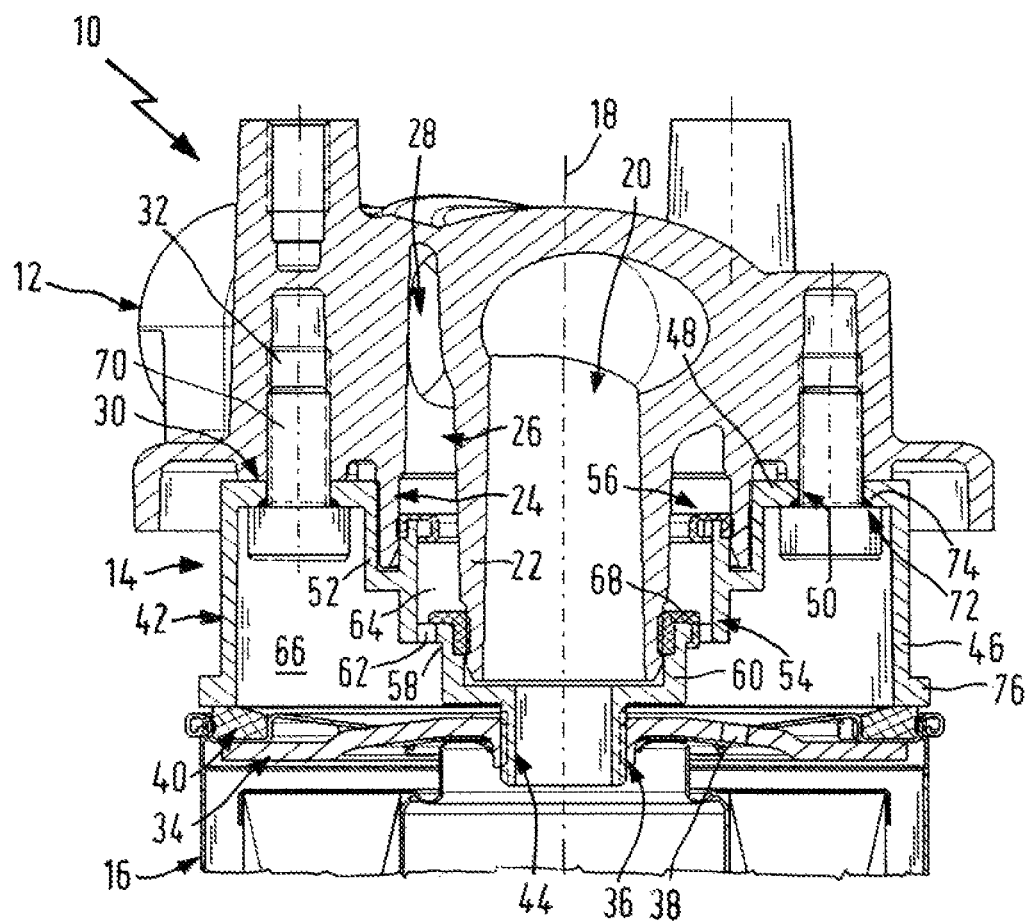
FIG. 1 shows a detail view of a longitudinal section of a filter device for motor oil of an internal combustion engine, with a connection head, an exchangeable filter, and a connection adapter according to a first embodiment for detachably connecting the exchangeable filter to the connection head.
Figure 2:
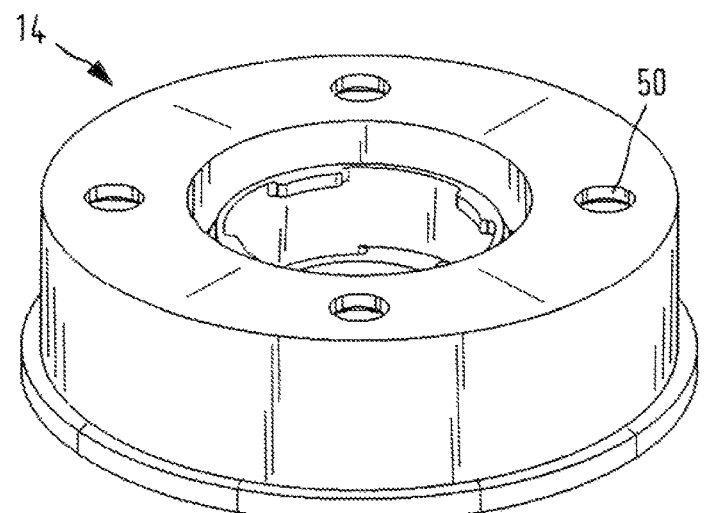
FIG. 2 shows an isometric illustration of the connection adapter of FIG. 1 in a first perspective view.
Figure 3:
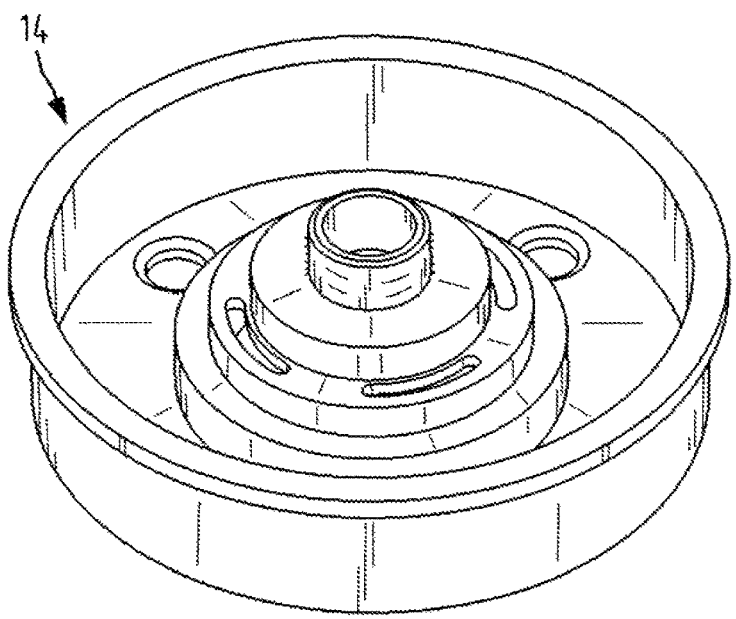
FIG. 3 shows an isometric illustration of the connection adapter of FIG. 1 in a second perspective view.
Figure 4:
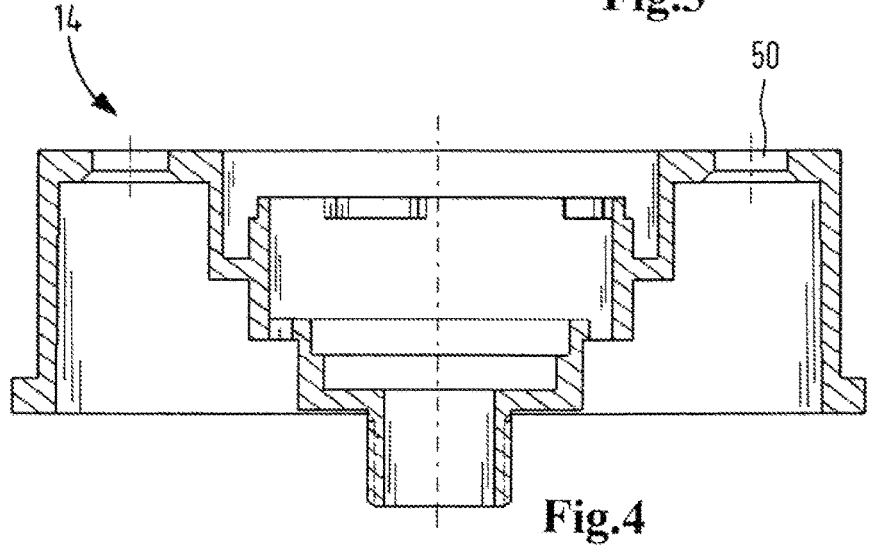
FIG. 4 shows the connection adapter of FIGS. 1 to 3 in a longitudinal section parallel to a connecting axis.
Figure 5:
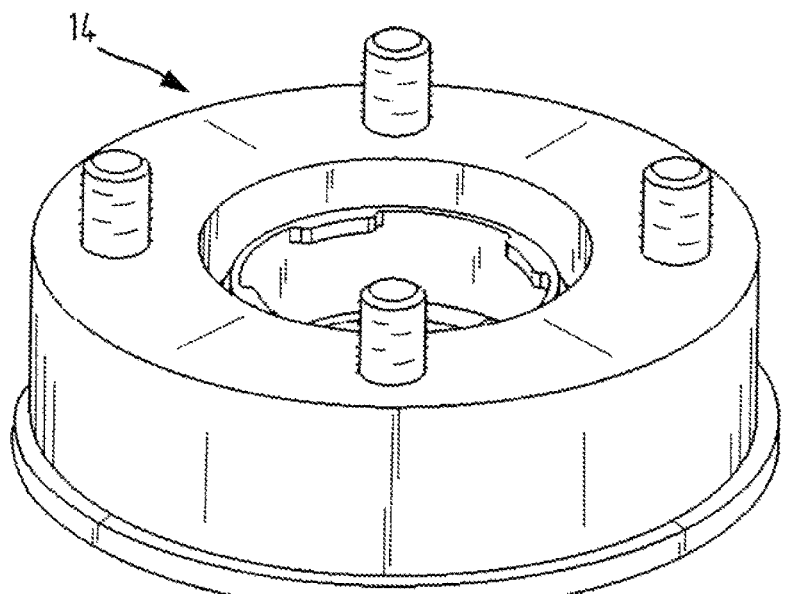
FIG. 5 shows the connection adapter in the first perspective view of FIG. 2 with inserted fastening screws.
Figure 6:
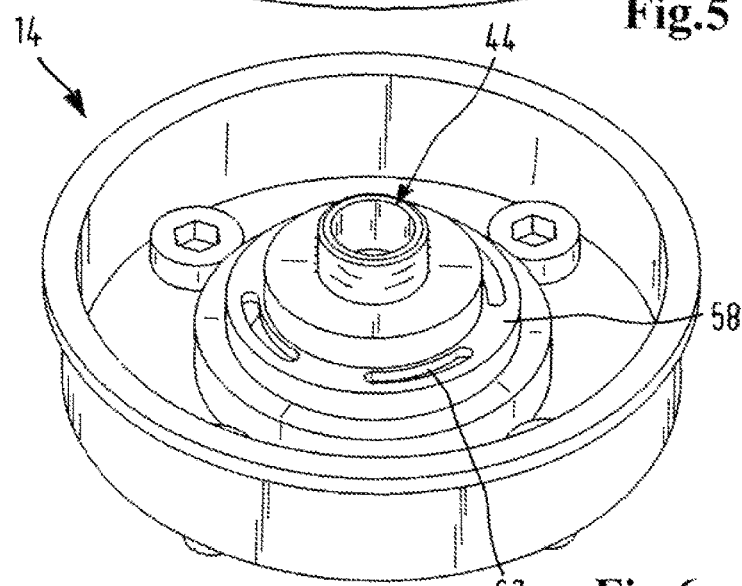
FIG. 6 shows the connection adapter in the second perspective view of FIG. 3 with inserted fastening screws.
Figure 7:
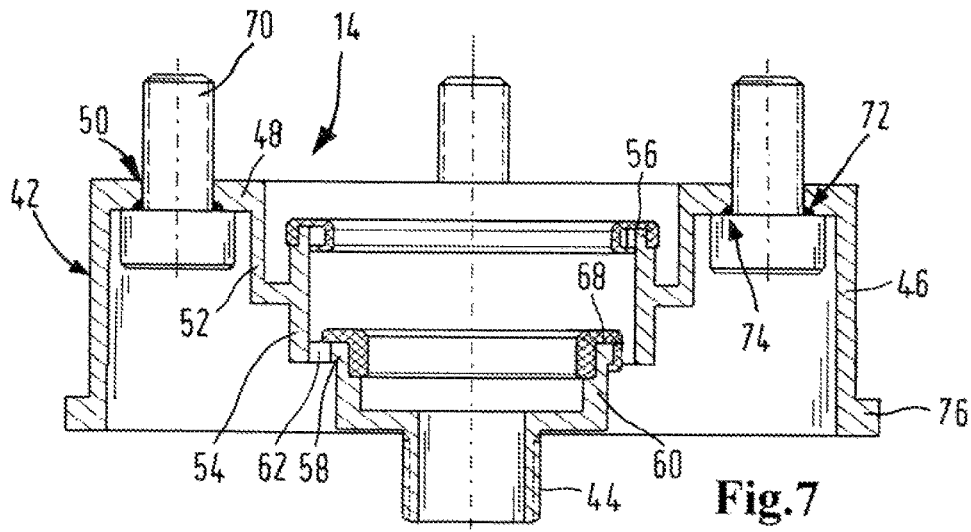
FIG. 7 shows the connection adapter in the longitudinal section of FIG. 4 with inserted fastening screws.
Figure 9:
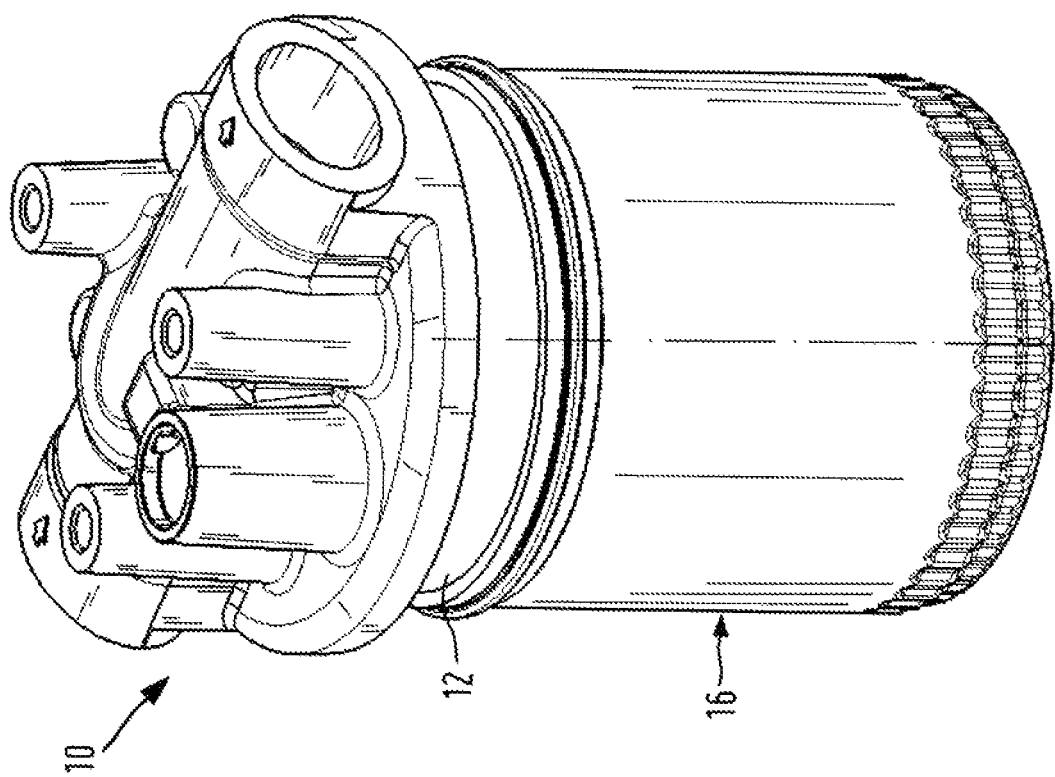
FIG. 9 shows an isometric illustration of the entire filter device of FIG. 1.
Figure 8:
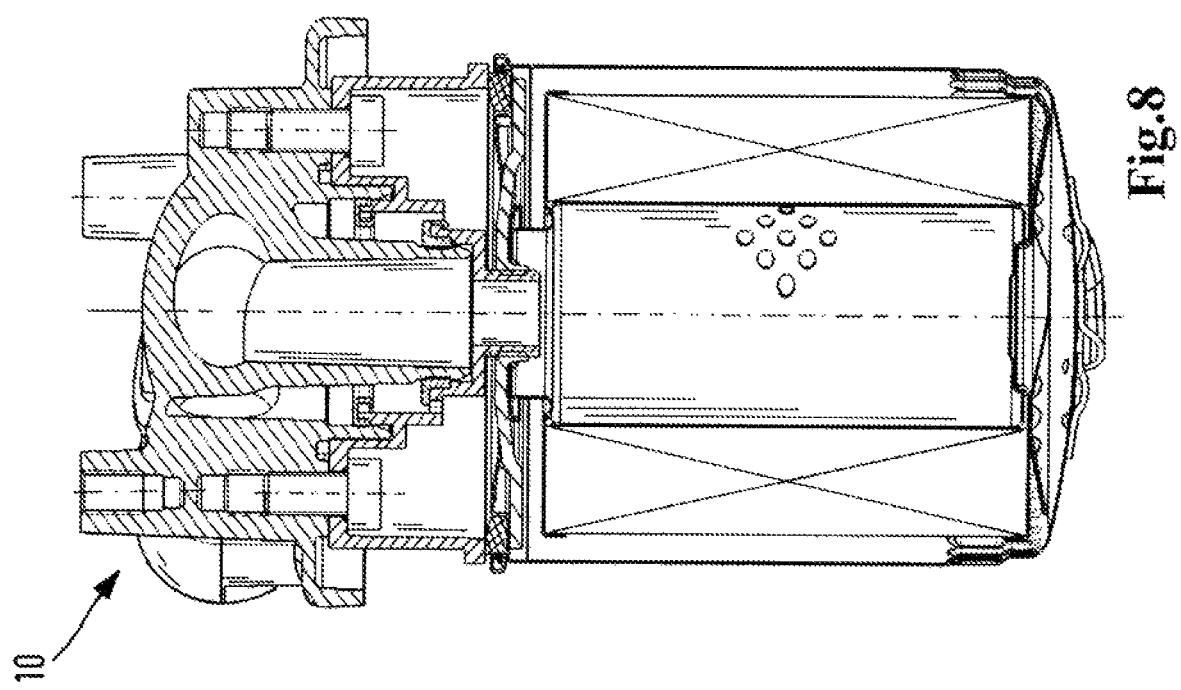
FIG. 8 shows a longitudinal section of the entire filter device of FIG. 1.
Figure 10:
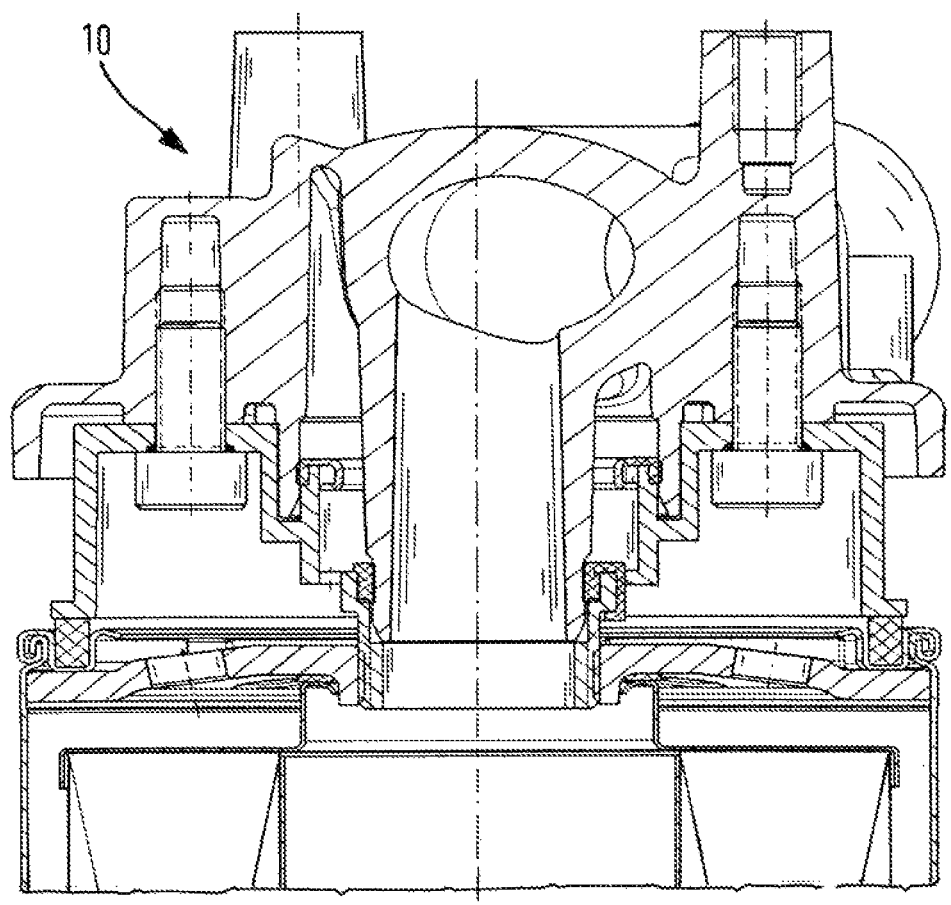
FIG. 10 shows a detail view of a longitudinal section of a filter device for motor oil of an internal combustion engine, with a connection head, an exchangeable filter, and a connection adapter according to a second embodiment.
Figure 11:
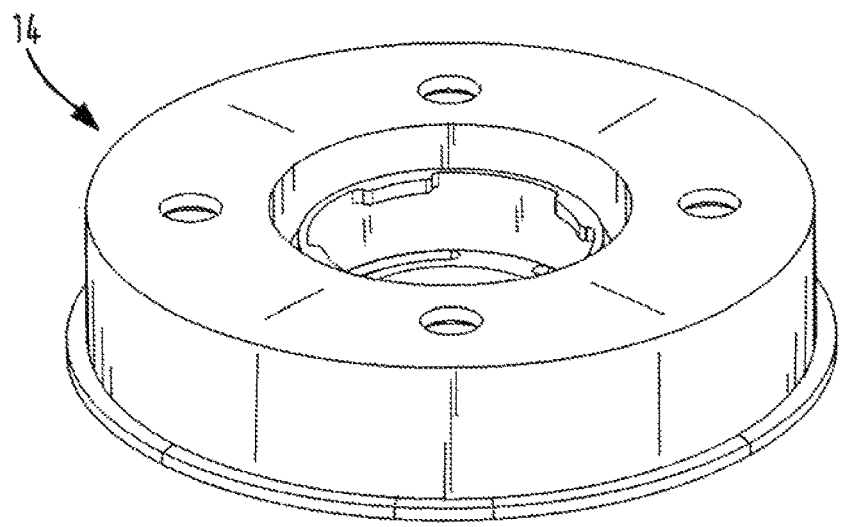
FIG. 11 shows an isometric illustration of the connection adapter of FIG. 10 in a first perspective view.
Figure 12:
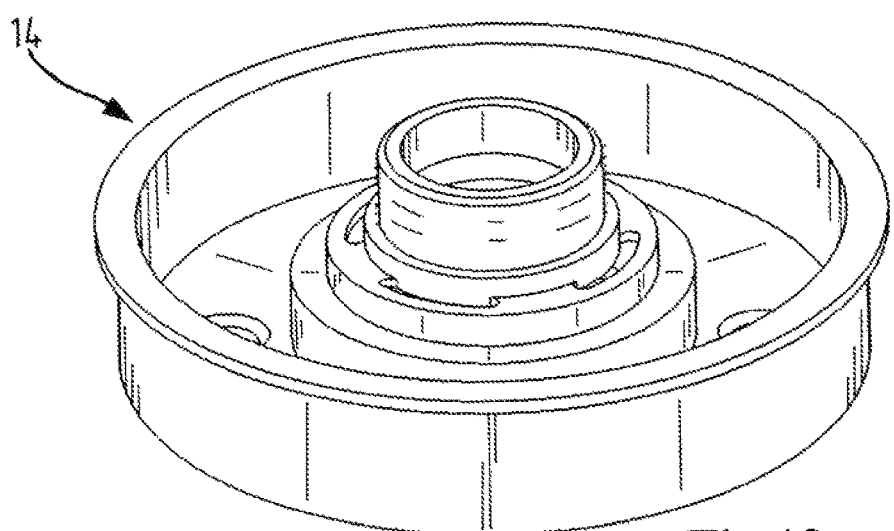
FIG. 12 shows an isometric illustration of the connection adapter of FIG. 10 in a second perspective view.
Figure 13:
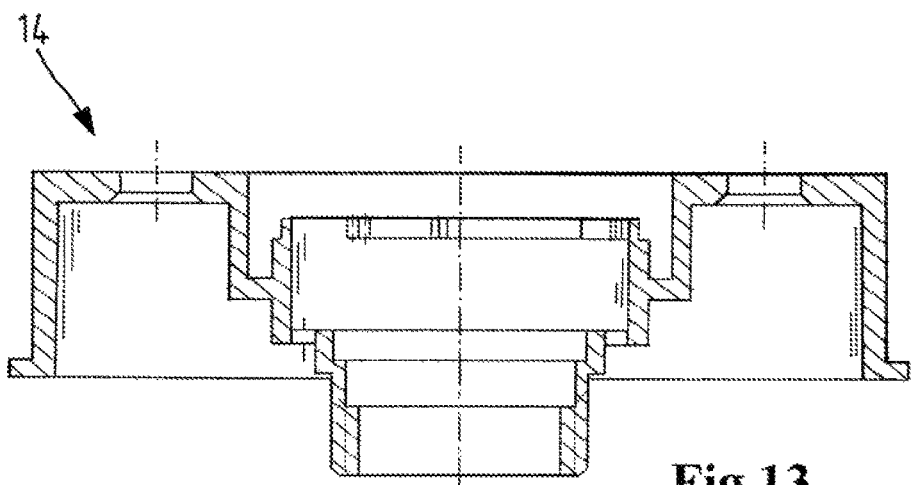
FIG. 13 shows the connection adapter of FIG. 10 in a longitudinal section parallel to the connecting axis.
Figure 14:
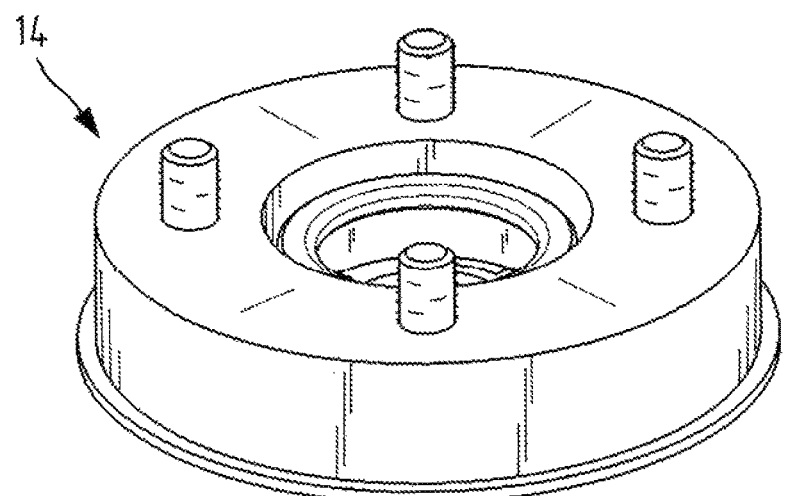
FIG. 14 shows the connection adapter in the first perspective view of FIG. 11 with inserted fastening screws.
Figure 15:
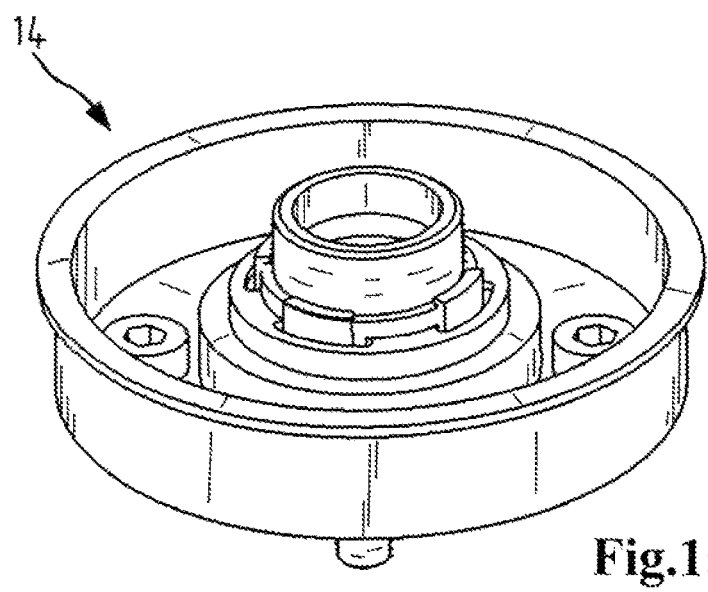
FIG. 15 shows the connection adapter in the second perspective view of FIG. 12 with inserted fastening screws.
Figure 16:
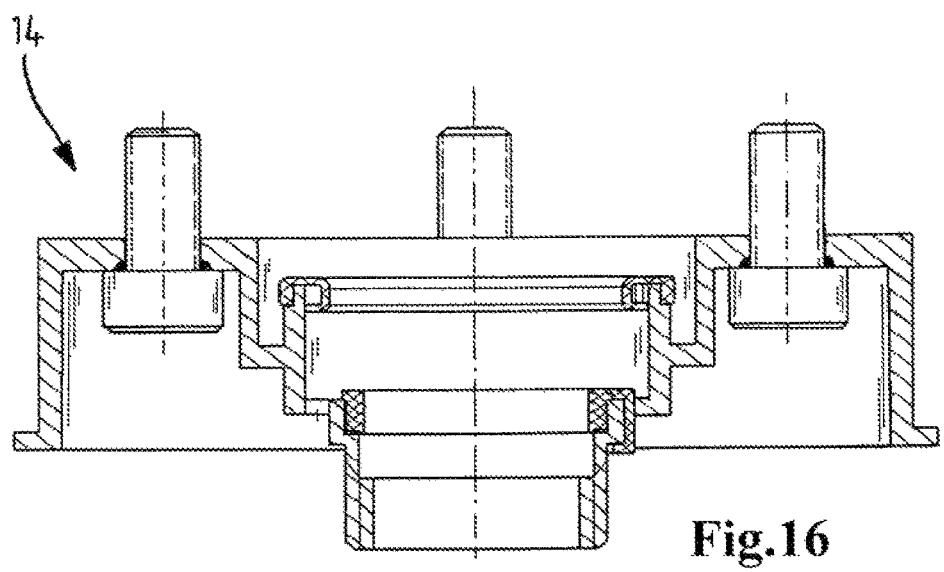
FIG. 16 shows the connection adapter in the longitudinal section of FIG. 13 with inserted fastening screws.
Figure 18:
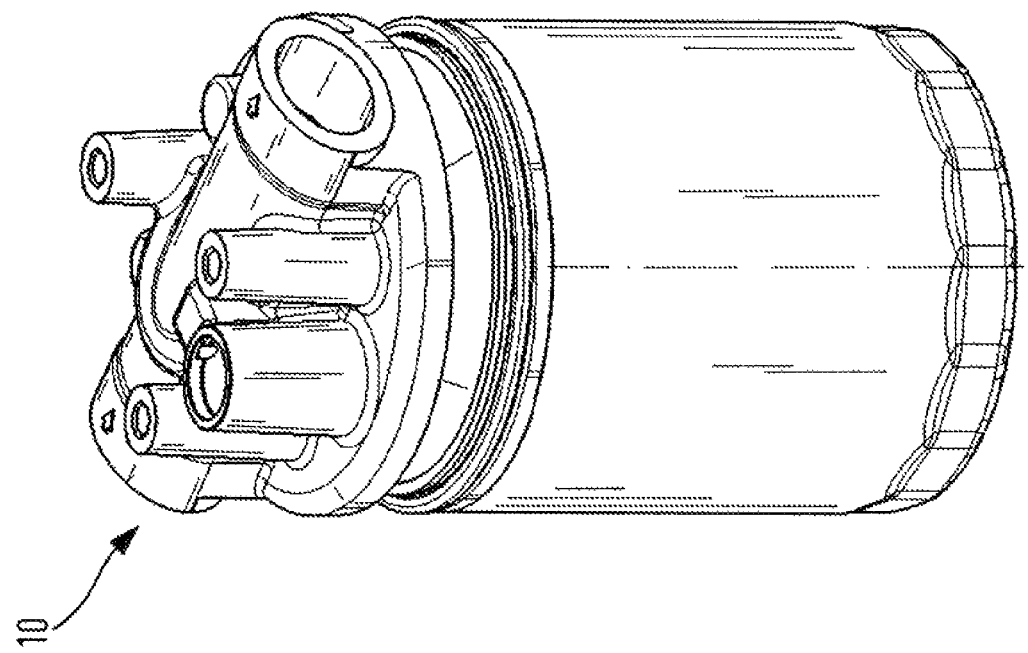
FIG. 18 shows an isometric illustration of the entire filter device of FIG. 10.
Figure 17:
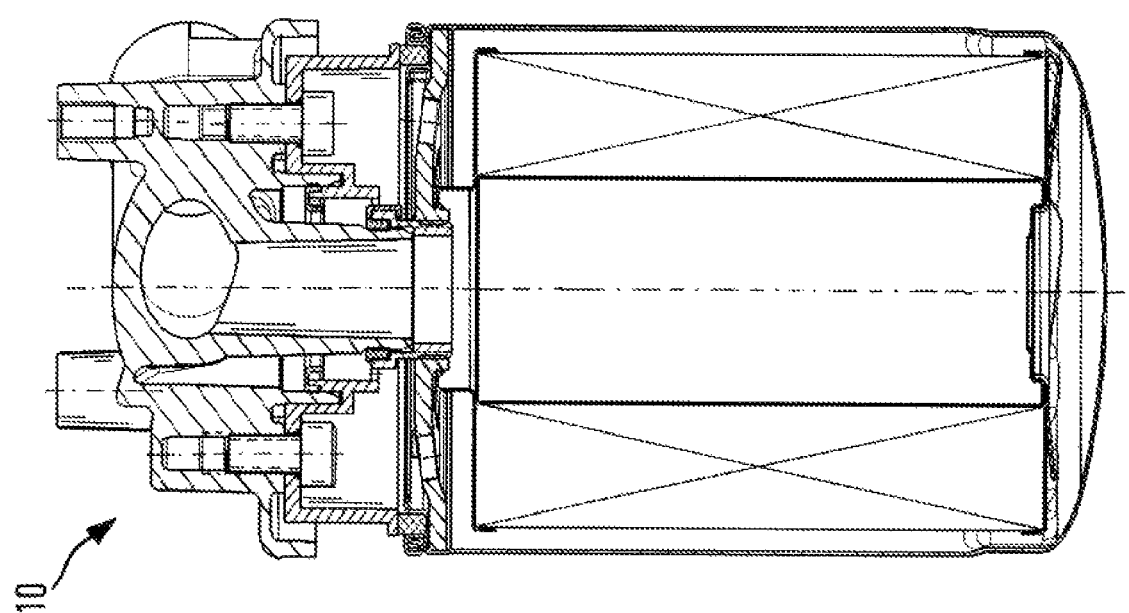
FIG. 17 shows a longitudinal section of the entire filter device of FIG. 10.
Figure 19:
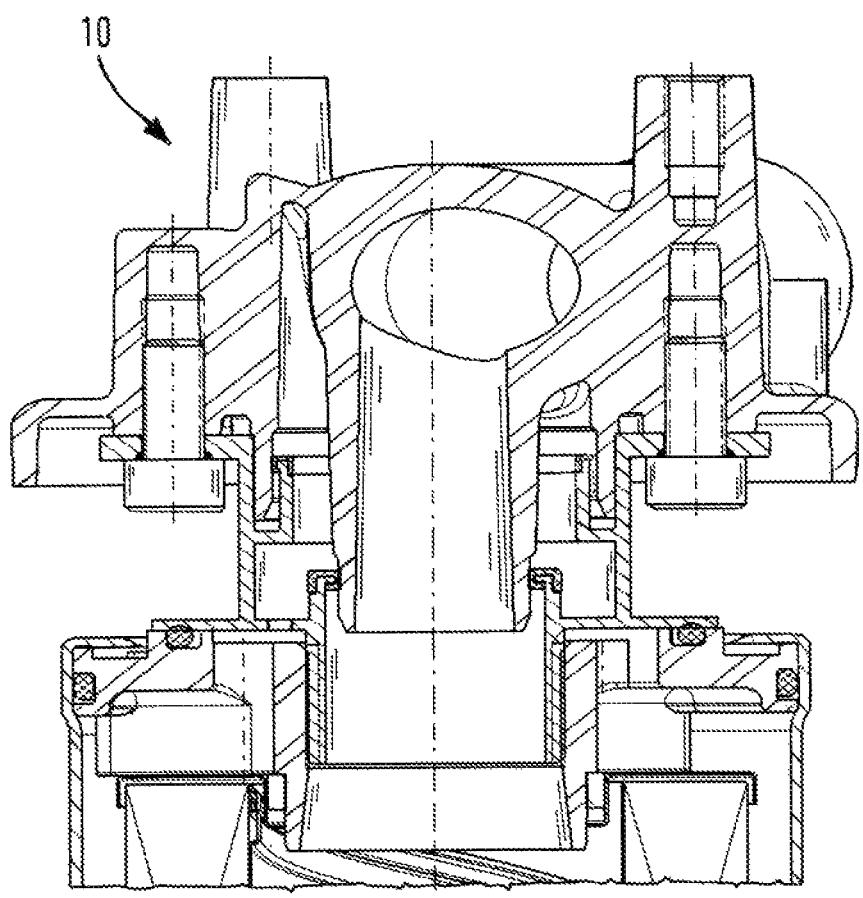
FIG. 19 shows a detail view of a longitudinal section of a filter device for motor oil of an internal combustion engine, with a connection head, an exchangeable filter, and a connection adapter according to a third embodiment.
Figure 20:
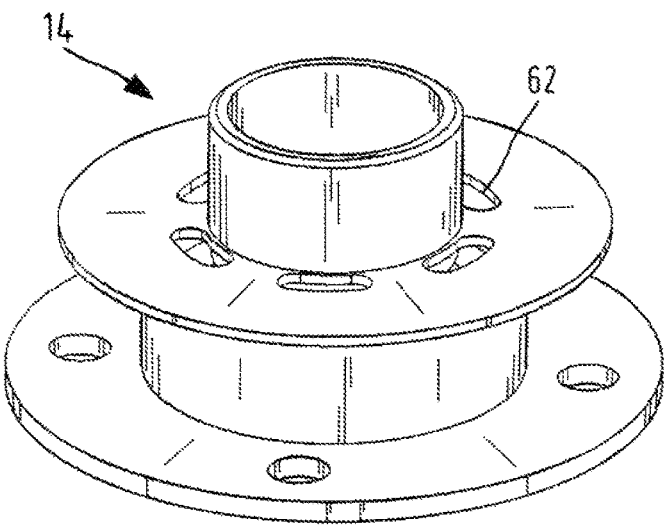
FIG. 20 shows an isometric illustration of the connection adapter of FIG. 19 in a first perspective view.
Figure 21:
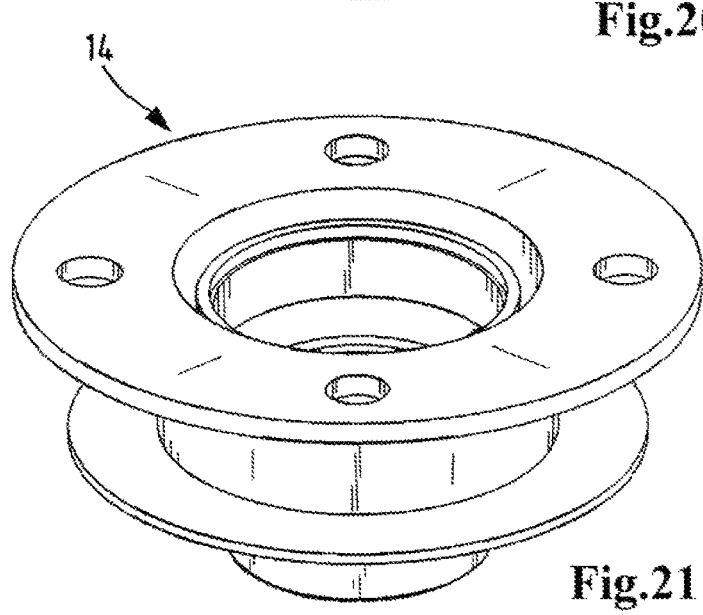
FIG. 21 shows an isometric illustration of the connection adapter or FIG. 19 in a second perspective view.
Figure 22:
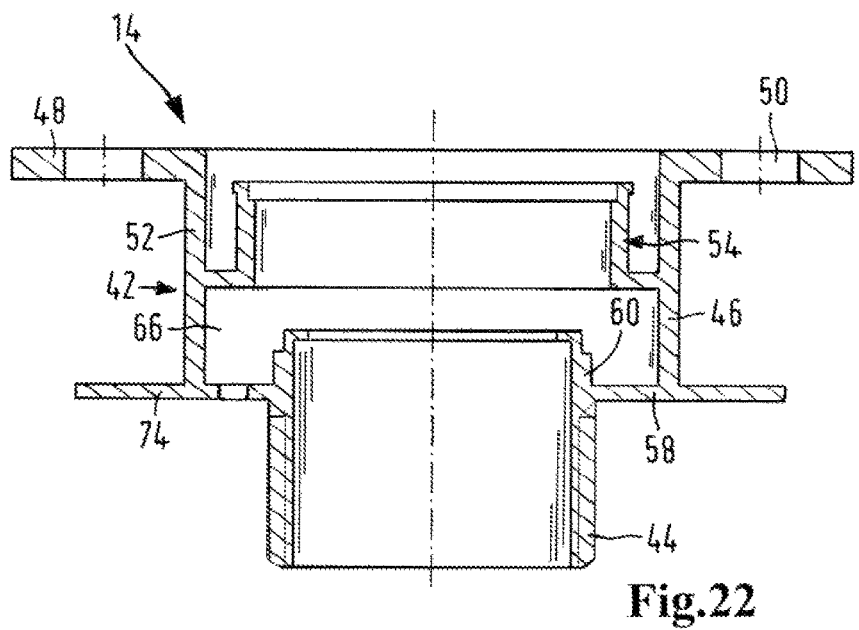
FIG. 22 shows the connection adapter of FIG. 19 in a longitudinal section parallel to a connecting axis.
Figure 23:
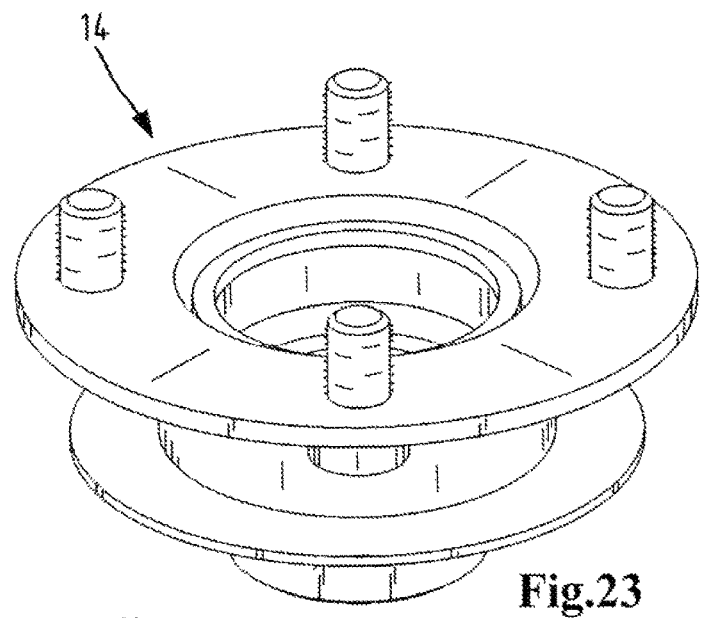
FIG. 23 shows the connection adapter in the first perspective view of FIG. 20 with inserted fastening screws.
Figure 24:
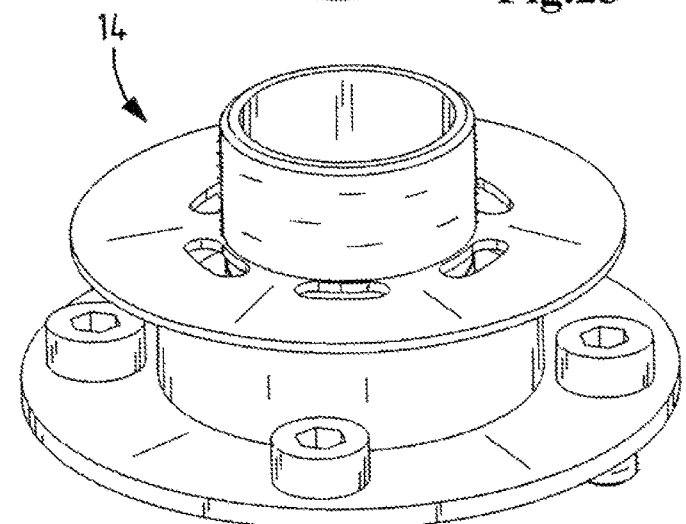
FIG. 24 shows the connection adapter in the second perspective view of FIG. 21 with inserted fastening screws.
Figure 25:
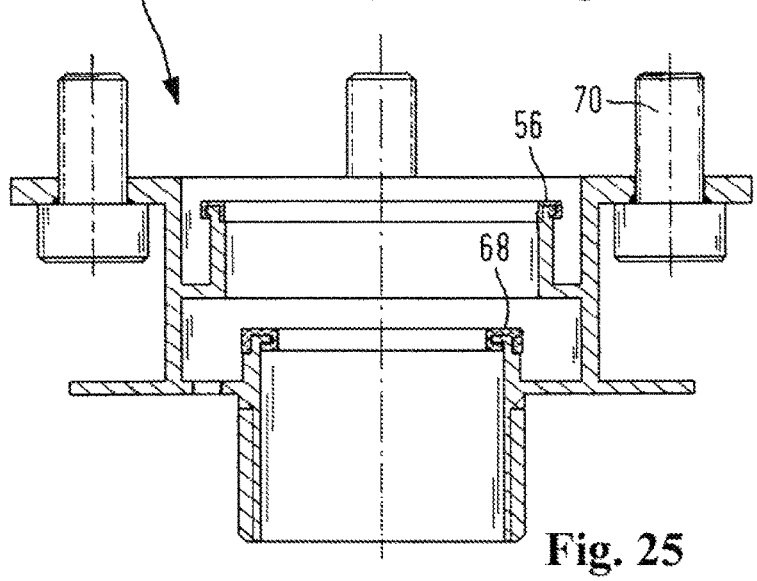
FIG. 25 shows the connection adapter in the longitudinal section of FIG. 22 with inserted fastening screws.
Figure 27:
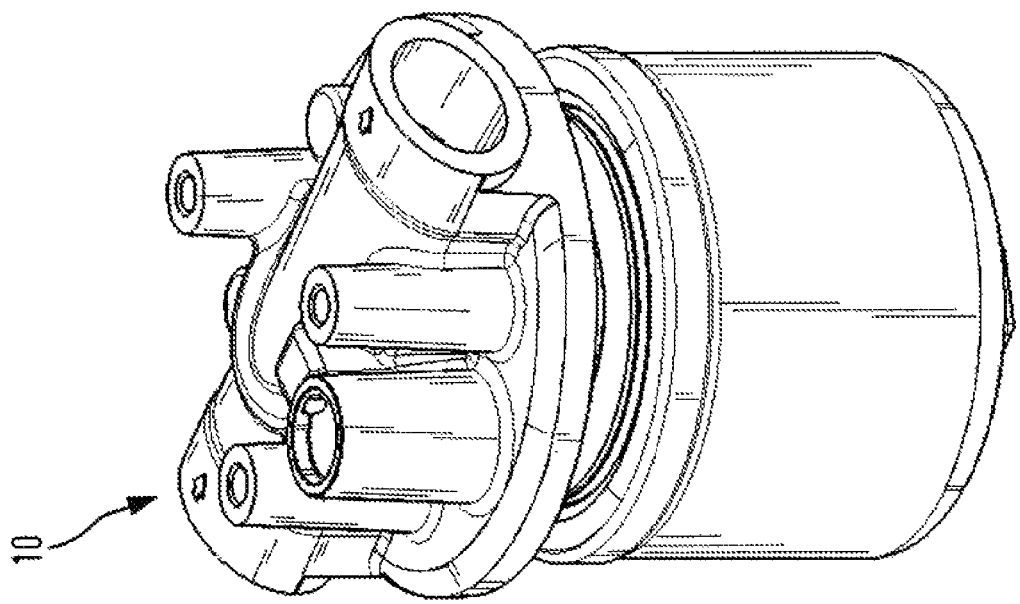
FIG. 27 shows an isometric illustration of the entire filter device of FIG. 19.
Figure 26:
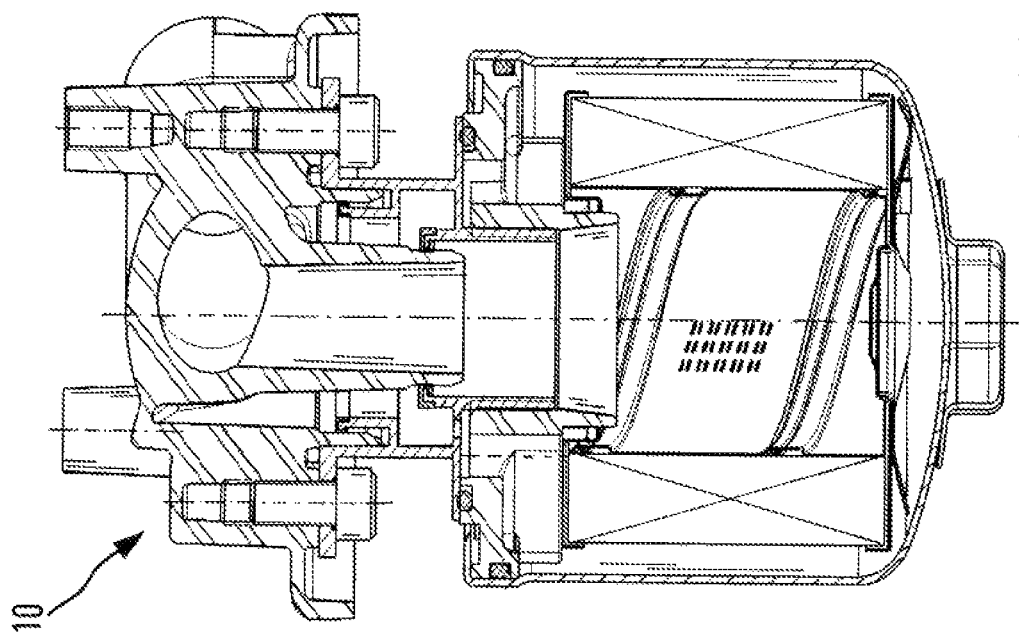
FIG. 26 shows a longitudinal section of the entire filter device of FIG. 19.

The filter device 10 comprises a connection head 12, at the top in FIG. 1, to which, at the bottom, is detachably screwed on a treatment element in the form of an exchangeable filter 16 by means of a connection adapter 14 according to a first embodiment. The filter device 10 comprises an imaginary connecting axis 18 relative to which a detachable screw connection between the exchangeable filter 16 and the connection adapter 14 is realized.

When in the following Aradial@, Aaxial@, Acoaxial@, Acircumferential@, Aeccentric@ or the like is mentioned, this relates to the connecting axis 18, if nothing else is mentioned.

The connection head 12 can be fixedly connected to a component of the internal combustion engine, for example, a motor block or a frame of the internal combustion engine. The connection head 12 comprises an outlet conduit 20 for purified oil which opens into a coaxial connecting socket 22 at the connecting side of the connection head 12 which is facing the exchangeable filter 16.

The radially outer circumferential side of the connecting socket 22 extends conically and tapers toward the free end of the connecting socket 22 which is facing the connection adapter 14.

In the region of its end that is axially facing away from the exchangeable filter 16, the connecting socket 22 is surrounded by a coaxial annular wall 24. An annular inlet space 26, into which an inlet conduit 28 of the connection head 12 for motor oil to be purified opens, is realized radially between the annular wall 24 and the connecting socket 22.

The annular wall 24 is surrounded radially outwardly by an annular coaxial connecting surface 30 which is facing the connection adapter 14. In the connecting surface 30, a total of 4 threaded bores 32 are arranged, distributed uniformly in circumferential direction, whose axes extend parallel to the connecting axis 18.

The exchangeable filter 16 is a generally known spin-on filter. The exchangeable filter 16 comprises a filter housing in which a filter element for purifying the motor oil is arranged. A housing cover 34 closes off the filter housing and is arranged at the side which is axially facing the connection head 12.

The housing cover 34 comprises a coaxial connecting opening 36 with an inner thread which serves also as an outlet for purified motor oil. The connecting opening 36 is connected with a clean oil-side region of the interior of the filter housing.

The connecting opening 36 is surrounded by a plurality of eccentrically arranged inlet openings 38 for motor oil to be purified which lead into a raw oil-side region of the interior of the filter housing.

In the region of its radial outer rim, a coaxial circumferentially continuous annular seal 40 is arranged at the housing cover 34. The annular seal 40 seals in axial direction relative to the connection adapter 14.

The connection adapter 14 is arranged axially between the connection head 12 and the exchangeable filter 16. The connection adapter 14 as a whole is of a one piece configuration. The connection adapter 14 has externally an approximately cup-shaped form. It comprises a connecting section 42 for connecting to the connection head 12 and a coaxial threaded socket section 44 with an outer thread for screwing on the inner thread of the connecting opening 36 of the exchangeable filter 16.

The connection adapter 14 comprises a coaxial circumferentially continuous circumferential wall 46 that is adjoined, at the bottom side of the cup-shaped connection adapter 14 facing axially the connection head 12, by a circumferentially extending annular coaxial fastening section 48. In the fastening section 48, as an example four screw holes 50 are arranged, circumferentially uniformly distributed, which are correlated respectively with the threaded bores 32 of the connection head 12. The screw holes 50, viewed in radial direction, are arranged approximately centrally in the fastening section 48, respectively.

A first cylinder section 52 in the form of a hollow cylinder adjoins a radially inner rim of the fastening section 48 and extends away from the fastening section 48 coaxially into the interior of the cup-shaped connection adapter 14. The first cylinder section 52 passes unitarily into a second coaxial head-associated cylinder section 54 which also has the shape of a hollow cylinder. The diameter of the head-associated cylinder section 54 is smaller than that of the first cylinder section 52. The head-associated cylinder section 54 overlaps the first cylinder section 52 at the side which is axially facing the connection head 12. An end of the annular wall 24 of the connection head 12 is inserted in the mounted state into a groove which is formed thus between the radially inner circumferential side of the first cylinder section 52 and the radially outer circumferential side of the head-associated cylinder section 54.

At the end face rim of the head-associated cylinder section 54 which is facing the connection head 12, a raw oil-side coaxial annular seal 56 is arranged which seals the head-associated cylinder section 54 relative to the first cylinder section 52 at the raw oil side relative to the annular inlet space 26 and forms part of a head sealing device.

At its axially oppositely positioned rim which is facing the exchangeable filter 16, the head-associated cylinder section 54 passes by means of a collar 58, which is extending radially inwardly, into a third coaxial element-associated cylinder section 60, also in the form of a hollow cylinder. The diameter of the element-associated cylinder section 60 is smaller than the diameter of the head-associated cylinder section 54.

A plurality of oil passage holes 62 are arranged, circumferentially distributed, in the collar 58. An oil-conducting annular space 64 is connected to an oil inlet space 66 via the oil passage holes 62. The annular space 64 is arranged radially between the radially inner circumferential side of the head-associated cylinder section 54 and a radially outer circumferential side of the connecting socket 22. The oil inlet space 66 is delimited by the fastening section 48, the cylinder sections 52, 54, and 60, the circumferential wall 46, and in the mounted state by the housing cover 34 of the exchangeable filter 16.

At the side which is axially opposite the oil passage holes 62, a gap between the radially outer circumferential wall of the connecting socket 22 and the raw oil-side annular seal 56 provides an oil connection between the annular inlet space 26 of the connection head 12 and the annular space 64 in the region of the connection adapter 14.

The annular space 64, the oil passage holes 62, and the oil inlet space 66 form an oil conduit for the motor oil to be purified that is positioned relative to the threaded socket section 44 radially outwardly for connecting the annular inlet space 26 associated with the connection head 12 to the inlet openings 38 associated with the exchangeable filter 16.

At the rim of the element-associated cylinder section 60 that is axially facing the connection head 12, a coaxial circumferentially continuous clean oil-side annular seal 68 is arranged. The clean oil-side annular seal 68 seals the radially outer circumferential side of the connecting socket 22 relative to the element-associated cylinder section 60 and separates the raw oil-side annular space 64 from the clean oil-side interiors of the threaded socket section 44 and of the connecting socket 22. The annular seal 68 is part of an element sealing device.

At the side which is facing axially away from the clean oil-side annular seal 68, the element-associated cylinder section 60 passes by means of a radially inwardly extending shoulder into the threaded socket section 44 that tapers in cross section.

When the exchangeable filter 16 is mounted, the free end face of the connecting socket 22 is resting against the shoulder at the transition between the element-associated cylinder section 60 and the threaded socket section 44. The interior of the threaded socket section 44 forms an oil passage channel for connecting the clean oil-side interior of the exchangeable filter 16 to the outlet conduit 20.

For fixation of the connection adapter 14, four fastening screws 70 are provided as an example, which pass from the side facing the exchangeable filter 16 through the screw holes 50 and are screwed into the threaded bores 32.

Between the heads of the fastening screws 70 and the fastening section 48, an annular seal, for example, in the form of O-ring seals 72, is arranged, respectively. The O-ring seal 72 are positioned seal-tightly against corresponding annular sealing surfaces 74 each surrounding the respective screw holes 50. The O-ring seals 72 seal the raw oil-side oil inlet space 66 in the region of the fastening screws 70 relative to the environment. An O-ring seal 72 forms together with the corresponding sealing surface 74 a screw hole sealing device, respectively.

The free rim of the circumferential wall 46 facing the exchangeable filter 16 comprises a sealing collar 76 that is preferably extending radially outwardly in order to provide a sealing surface that is wider than the thickness of the circumferential wall 46. The sealing collar 76 is positioned seal-tightly against the annular seal 40 of the exchangeable filter 16.

In FIGS. 10 to 18, a filter device 10 with a connection adapter 14 according to a second embodiment is illustrated. Those elements that are similar to those of the first embodiment of FIGS. 1 to 9 are provided with the same reference characters. The second embodiment differs from the first embodiment in that the screw holes 50, instead of being centrally arranged in the fastening section 48, are displaced relative to the first cylinder section 52 radially inwardly.

In FIGS. 19 to 27, a filter device 10 with a connection adapter 14 according to a third embodiment is illustrated. Those elements that are similar to those of the first embodiment of FIGS. 1 to 9 are provided with the same reference characters. The third embodiment differs from the first embodiment in that the circumferential wall 46 is displaced radially inwardly so that the screw holes 50 are located radially outside of the circumferential wall 46. Also, the circumferential wall 46 passes directly into the first cylinder section 52. The circumferential wall 46 is connected with its rim facing axially the exchangeable filter 16 by means of an annular disk-shaped connection, which comprises the oil passage holes 62 and the sealing surface 74, to the element-associated cylinder section 60. The element-associated cylinder section 60 itself passes with the same diameter directly into the threaded socket section 44.

Figure 28:
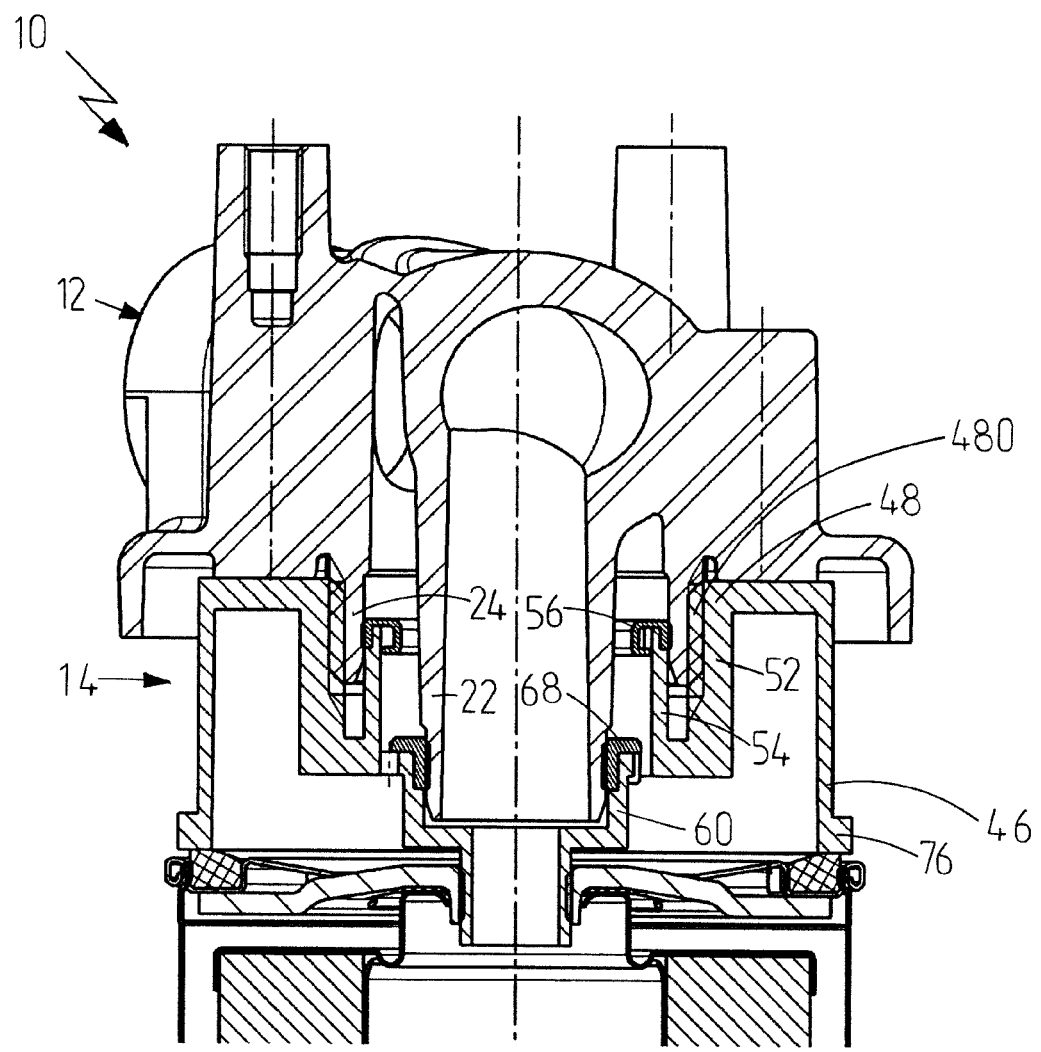
FIG. 28 shows a detail view of a longitudinal section of an alternative filter device which, relative to the embodiment of FIG. 1, differs in the type of fastening action, with a connection head, an exchangeable filter, and a connection adapter according to a fourth embodiment for detachably connecting the exchangeable filter to the connection head.

In FIG. 28, a filter device 10 with a connection adapter 14 according to a fourth embodiment is illustrated which relative to the embodiment of FIGS. 1 through 9 differs by the type of fastening action of the connection adapter 14 at the connection head 12. Here, instead of the screws 70, a central thread 480 between connection head 12 and connection adapter 14 is provided. This has the advantage that no screw holes 50 (see FIG. 1) must be provided. The central thread 480 is preferably arranged, as illustrated, radially outside of the seals, in particular outside of the head sealing device 56 and of the clean oil-associated annular seal 68, and thus outside of the region which is flowed through or contacted by the fluids. Preferably, as illustrated in FIG. 28, the first cylinder section 52 comprises an inner thread and the annular wall 24 an outer thread for forming this central thread 480. Accordingly, the alternative connection adapter 14 has a coaxial circumferentially continuous circumferential wall 46, in deviation from the embodiment of FIG. 1 a closed bottom side of the cup-shaped connection adapter 14 facing axially the connection head 12, as well as a fastening section 48 adjoining the bottom side which is formed by the central thread 480. The central thread 480 is coaxial to the seals 68, 56. The central thread 480 is preferably arranged axially relative to the seals 68, 56 such that the latter reach the sealing position only once a portion of the thread path of the inner thread has been overcome when it is mounted. In this way, a good centering action is achieved and the risk of canting or of damages to the seals 68, 56 during mounting can be prevented. It is understood that an analog modification is also possible and inventive for the embodiments shown in FIGS. 10 to 18 and 19 to 27, wherein the first cylinder section 52 comprises an inner thread as a central thread 480, respectively. In all variants, the central thread is preferably, viewed radially, outside of the seals 56, 68; in other words, the central thread 480 comprises preferably a greater diameter than the seals 56, 68 and/or their sealing surfaces.

What is claimed is:

1. A connection adapter for connecting an exchangeable fluid treatment apparatus onto a connection head of a fluid treatment device, wherein
the fluid treatment apparatus is configured to filter and/or treat a fluid, the connection adapter, wherein
wherein an exterior of the connection adapter is approximately cup-shaped, the connection adapter comprising:
a circumferential outer wall extending axially between a first axial side of the connection adapter to a second axial side of the connection adapter;
wherein the first side is the connection adapter is configured to connect onto the connection head, when in an installed state;
wherein the second side of the connection adapter is configured to detachably threadably engage and mount the exchangeable fluid treatment apparatus, mounting the fluid treatment apparatus onto the connection head through the connection adapter;
an annular threaded socket arranged at the second side is of the connection adapter and configured to detachably threadably engage and mount the fluid treatment device, when in the installed state;
wherein the annular threaded socket defines and surrounds a connecting axis;
wherein axial, as used herein, is a direction of the connecting axis;
wherein radial is a direction transverse to the connecting axis;
wherein the circumferential outer wall radially surrounds and is coaxial with the annular threaded socket;
wherein the connection adapter further comprises:
a bottom wall having an annular coaxial fastening section adjoining the circumferential outer wall, the annular coaxial fastening section comprising:
at least two screw holes configured to receive screws or threaded bolts to fasten the connection adapter to the connection head when in the installed state; or
a central thread arranged on the bottom wall and surrounding an axially extending circumferential groove or opening in the bottom wall, wherein the central thread is configured to threadably engage a connection head-associated central thread, when in the installed state;
wherein, when in the installed state, the connection adapter is arranged between and detachably mounts the fluid treatment apparatus to the connection head of a fluid treatment device;
wherein a first cylindrical wall is a hollow cylinder connected to the annular coaxial fastening section and projects axially in a direction towards the second side of the connection adapter;
wherein a second cylindrical wall is a second hollow cylinder connected to the first cylindrical wall and arranged radially inwardly from the first cylindrical wall;
wherein a third cylinder cylindrical wall is connected to the second hollow cylinder and arranged radially inwardly from the second hollow cylinder;
wherein the annular threaded socket is connected to and opens into an interior of the third cylinder cylindrical wall.

2. The connection adapter according to claim 1, wherein the at least two screw holes, relative to the connecting axis, are arranged radially outside of the annular threaded socket or radially outside of an axial projection of the annular threaded socket.

3. The connection adapter according to claim 1, further comprising
an annular fluid conducting space or chamber arranged radially between the annular threaded socket and the circumferential outer wall or radially outside of an axial projection of the annular threaded socket,
wherein the annular fluid conducting space or chamber is configured to connect a second fluid-connecting space of the exchangeable fluid treatment apparatus to a second fluid-conducting space of the connection head.

4. The connection adapter according to claim 1, wherein the bottom wall of the connection adapter includes the first cylindrical wall arranged coaxial to the connecting axis and radially within an interior of the circumferential outer wall, the first cylindrical wall configured to receive a connecting socket of the connection head when in the installed state;
wherein the connecting socket is coaxial to the connecting axis.

5. The connection adapter according to claim 1,
wherein the second cylindrical wall surrounds at least one fluid-conducting annular space of the connection adapter.

6. The connection adapter according to claim 5, wherein at least one of the at least two screw holes is arranged relative to the connecting axis radially within the circumferential outer wall or radially within an axial projection of the circumferential outer wall.

7. The connection adapter according to claim 5, wherein at least one of the at least two screw holes is arranged relative to the connecting axis radially outside of the first cylindrical wall or radially outside of an axial projection of the first cylindrical wall.

8. The connection adapter according to claim 1, further comprising
a sealing collar arranged on the second side is the connection adapter facing the fluid treatment apparatus,
wherein the fluid treatment apparatus is an exchangeable filter, wherein the sealing collar is configured to contact an outer annular seal of the exchangeable filter, wherein the sealing collar projects radially outwardly from circumferential outer wall.

9. The connection adapter according to claim 8, wherein the sealing collar is arranged radially outside of the at least two screw holes or arranged radially outside of the central thread of the connection adapter.

10. The connection adapter according to claim 8, wherein the sealing collar is arranged at a free rim of the circumferential outer wall of the connection adapter that circumferentially surrounds, relative to the connecting axis, at least one fluid-conducting annular space of the connection adapter.

11. The connection adapter according to claim 1, further comprising
at least one part of an element sealing device configured to seal a connection to the treatment apparatus of the fluid treatment device.

12. The connection adapter according to claim 1, further comprising
at least one part of a head sealing device configured to seal a connection to the connection head of the fluid treatment device.

13. The connection adapter according to claim 1, further comprising
at least one part of an element sealing device configured to seal a connection to the fluid treatment apparatus and further comprising
at least one part of a head sealing device configured to seal a connection to the connection head.

14. The connection adapter according to claim 1, wherein, at least at one of the screw holes, at least one part of a screw hole sealing device is arranged.

15. The connection adapter according to claim 1, wherein the connection adapter is formed unitarily in one piece.

16. An assembly comprising:
the connection head of a treatment device for a fluid;
the connection adapter according to claim 1 configured to connect the fluid treatment apparatus to the connection head;
wherein the annular threaded socket of the connection adapter comprises
at least one fluid passage channel configured to connect a fluid-conducting space of the treatment apparatus to a fluid-conducting space of the connection head;
wherein the at least two screw holes of the annular coaxial fastening section receive at least two screws or threaded bolts fastening the connection adapter to the connection head.

* * * * *